United States Patent
Okamoto

(10) Patent No.: US 7,937,327 B2
(45) Date of Patent: May 3, 2011

(54) MUSIC CONTENT USING APPARATUS

(75) Inventor: Tetsuo Okamoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1032 days.

(21) Appl. No.: 11/022,140

(22) Filed: Dec. 23, 2004

(65) Prior Publication Data

US 2005/0160047 A1    Jul. 21, 2005

(30) Foreign Application Priority Data

Jan. 8, 2004    (JP) ................................ 2004-002837

(51) Int. Cl.
*G06F 21/00* (2006.01)
(52) U.S. Cl. .......................................... 705/57; 705/51
(58) Field of Classification Search ...................... 705/51
See application file for complete search history.

(56) References Cited

U.S. PATENT DOCUMENTS

| | | | | |
|---|---|---|---|---|
| 6,385,596 | B1 * | 5/2002 | Wiser et al. ...................... | 705/51 |
| 6,834,348 | B1 * | 12/2004 | Tagawa et al. .................. | 713/193 |
| 7,376,626 | B2 * | 5/2008 | Nagai et al. ...................... | 705/57 |
| 2001/0042048 | A1 * | 11/2001 | Boykin et al. ................... | 705/51 |
| 2002/0010826 | A1 | 1/2002 | Takahashi et al. | |
| 2002/0128928 | A1 | 9/2002 | Sukegawa | |
| 2002/0154779 | A1 * | 10/2002 | Asano et al. ................... | 380/277 |
| 2003/0055657 | A1 * | 3/2003 | Yoshida et al. ................ | 704/500 |
| 2003/0079222 | A1 * | 4/2003 | Boykin et al. .................. | 725/31 |
| 2004/0025058 | A1 * | 2/2004 | Kuriya et al. .................. | 713/201 |
| 2004/0144236 | A1 * | 7/2004 | Hiratsuka ....................... | 84/609 |

FOREIGN PATENT DOCUMENTS

| | | |
|---|---|---|
| EP | 0843449 | 5/1998 |
| EP | 1081574 | 3/2001 |
| EP | 1 345 105 A2 | 9/2003 |
| JP | 2001-184057 | 7/2001 |
| JP | 2002-073017 | 3/2002 |
| JP | 2002-358086 | 12/2002 |
| JP | 2003-271766 A | 9/2003 |
| WO | WO-02/23521 | 3/2002 |

OTHER PUBLICATIONS

IBM Cryptolopes, SuperDistribution and Digital Rights Management, Marc A. Kaplan, IBM Research, Dec. 30, 1996, XP002132994, Internet.

* cited by examiner

*Primary Examiner* — Evens J Augustin
*Assistant Examiner* — C. Aaron McIntyre
(74) *Attorney, Agent, or Firm* — Morrison & Foerster LLP

(57) ABSTRACT

An apparatus is designed for using a music content composed of at least one content material in accordance with security information of the music content. In the apparatus, a reading section reads a recording medium which records a data file of the music content having a chunk structure including a content material chunk and a security information chunk. The content material chunk contains substantial data of the content material and identification information for uniquely identifying the content material. The security information chunk contains security information of the content material and identification information for uniquely identifying the content material. A using section permits use of the content material when the identification information read from the content material chunk coincides with the other identification information read from the security information chunk.

5 Claims, 3 Drawing Sheets

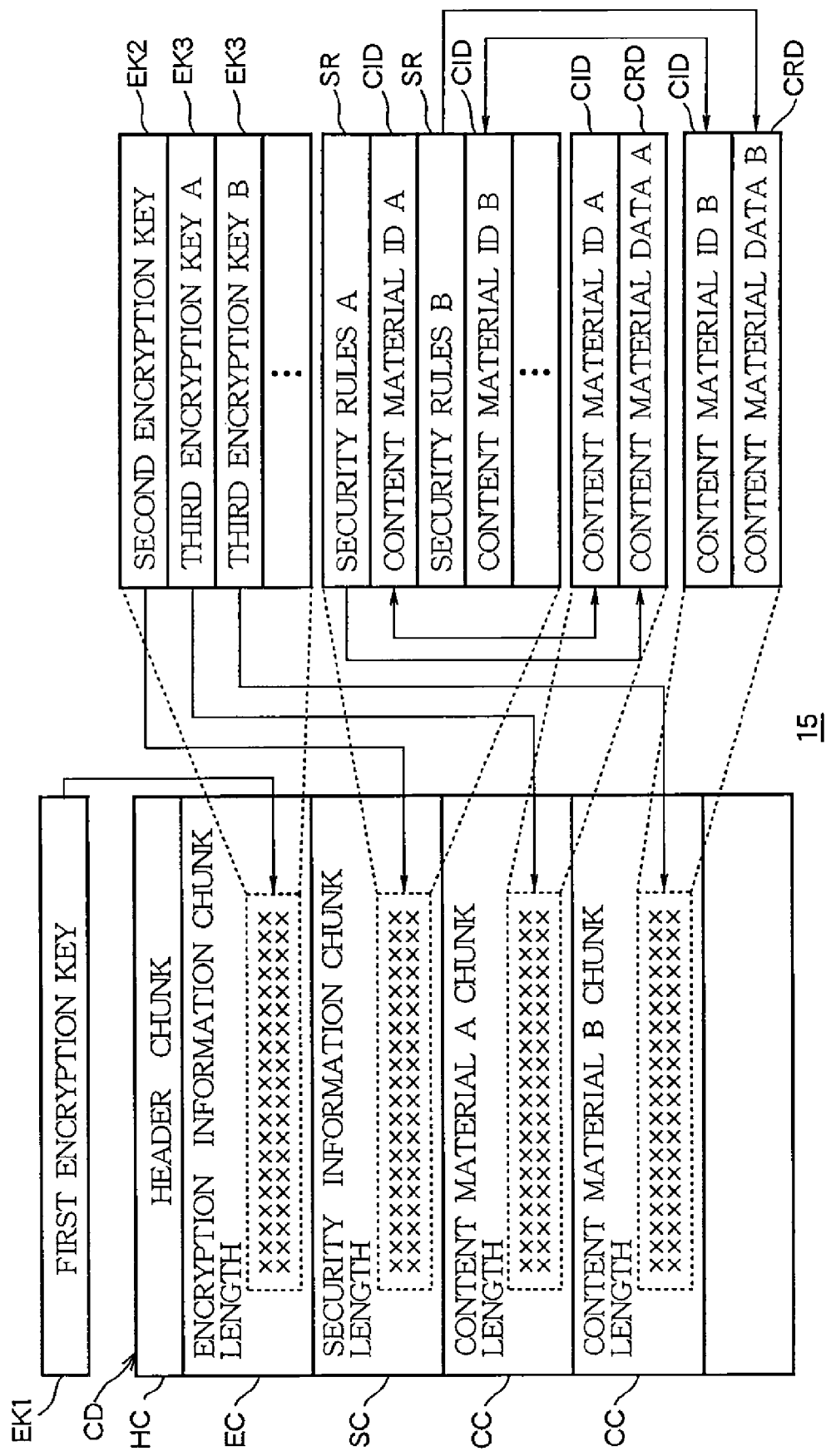

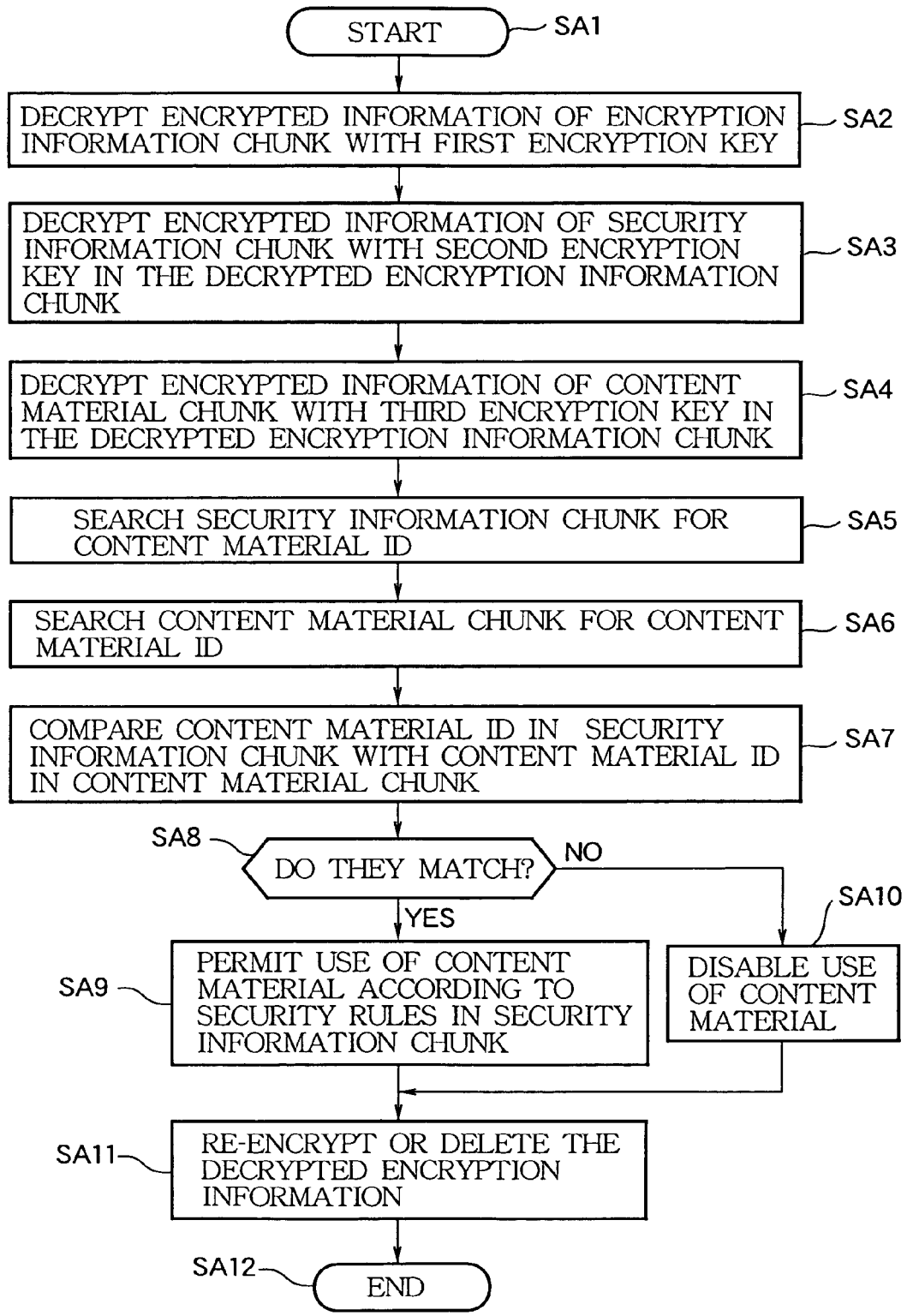

MUSIC CONTENT USING APPARATUS

BACKGROUND OF THE INVENTION

1. Technical Field

The present invention relates to a content data recording medium and a music content using apparatus, and more particularly to a content data recording medium capable of preventing unauthorized use of music content and a music content using apparatus capable of preventing unauthorized use of music content stored on the content data recording medium.

2. Background Art

Various approaches to protecting the copyright of music content have been conventionally proposed, which disable use of music content other than those purchased in an authorized manner. For example, there is a technique for preventing illegal use of music content by embedding in the music content a license ID(s) representing electronic music instruments licensed to use the music content. Such a technique is disclosed for example in Patent Document 1.

Patent document 1 is Japanese patent laid-open application No. 2003-271766.

There is a case where license information for preventing unauthorized use of music content is included in a header chunk of the music content. In this case, it is considered that the data could be tampered, for example, by acquiring the header chunk of a music content purchased in an authorized manner and combining the header chunk with a data part of another music content which is intended to use in an unauthorized manner. When the data is tampered in this manner, conventional methods of preventing unauthorized use may inadvertently allow the unauthorized use of the music content since the header chunk of the tampered music content contains the license information.

SUMMARY OF THE INVENTION

It is an object of the present invention to provide a music content using apparatus capable of preventing unauthorized use of music content.

It is another object of the present invention to provide a content data recording medium capable of preventing unauthorized use of music content.

In one aspect of the present invention, there is provided an apparatus for using a music content composed of at least one content material in accordance with security information of the music content. The inventive apparatus comprises a reading section that accesses a recording medium which records a data file of the music content having a chunk structure including a content material chunk and a security information chunk, the content material chunk containing substantial data of the content material and identification information for uniquely identifying the content material, the security information chunk containing security information of the content material and identification information for uniquely identifying the content material, the reading section reading the identification information from the content material chunk and the other identification information from the security information chunk separately from each other, a comparison section that compares the identification information read from the content material chunk with the other identification information read from the security information chunk, and a using section that permits use of the content material when the comparison section determines that the identification information read from the content material chunk coincides with the other identification information read from the security information chunk.

Preferably, the security information contained in the security information chunk specifies a mode of using the content material, so that the using section permits the use of the content material under the mode specified by the security information.

Preferably, the reading section decrypts the security information chunk and the content material chunk for reading the respective identification information from the recording medium since the security information chunk and the content material chunk have been recorded as an encrypted form in the recording medium.

Preferably, the security information contained in the security information chunk specifies at least one of modes of using the content material, the modes including a replay mode that permits audible replaying of the music content from the recording medium, and a copy mode that permits copying of the music content from the recording medium to another recording medium.

The invention includes a computer program installable in an apparatus having a processor for using a music content composed of at least one content material in accordance with security information of the music content. The computer program is executable by the processor for causing the apparatus to perform a method comprising the steps of accessing a recording medium which records a data file of the music content having a chunk structure including a content material chunk and a security information chunk, the content material chunk containing substantial data of the content material and identification information for uniquely identifying the content material, the security information chunk containing security information of the content material and identification information for uniquely identifying the content material, reading the identification information from the content material chunk and the other identification information from the security information chunk separately from each other, comparing the identification information read from the content material chunk with the other identification information read from the security information chunk, and permitting use of the content material when the identification information read from the content material chunk coincides with the other identification information read from the security information chunk.

In another aspect of the present invention, there is provided a recording medium providing a music content for use in a music apparatus. The music content is composed of at least one content material and security information specifying a mode of using the music content. The recording medium records a data file of the music content having a chunk structure comprising a content material chunk containing substantial data of the content material and identification information for uniquely identifying the content material, and a security information chunk containing security information of the content material and identification information for uniquely identifying the content material, whereby the music apparatus reads the identification information from the content material chunk and the other identification information from the security information chunk separately from each other, then compares the identification information read from the content material chunk with the other identification information read from the security information chunk, and permits use of the content material under the mode specified by the security information when the identification information read from the content material chunk coincides with the other identification information read from the security information chunk.

According to the present invention, a music content using apparatus capable of preventing unauthorized use can be provided.

Further, according to the present invention, a content data recording medium capable of preventing unauthorized use can be provided.

BRIEF DESCRIPTION OF THE DRAWINGS

FIG. 2 is a conceptual diagram illustrating the data format of a recording medium recording a music content according to the embodiment.

FIG. 3 is a flowchart illustrating a method for using a music content according to the embodiment of the present invention.

DETAILED DESCRIPTION OF THE INVENTION

Figure 1:
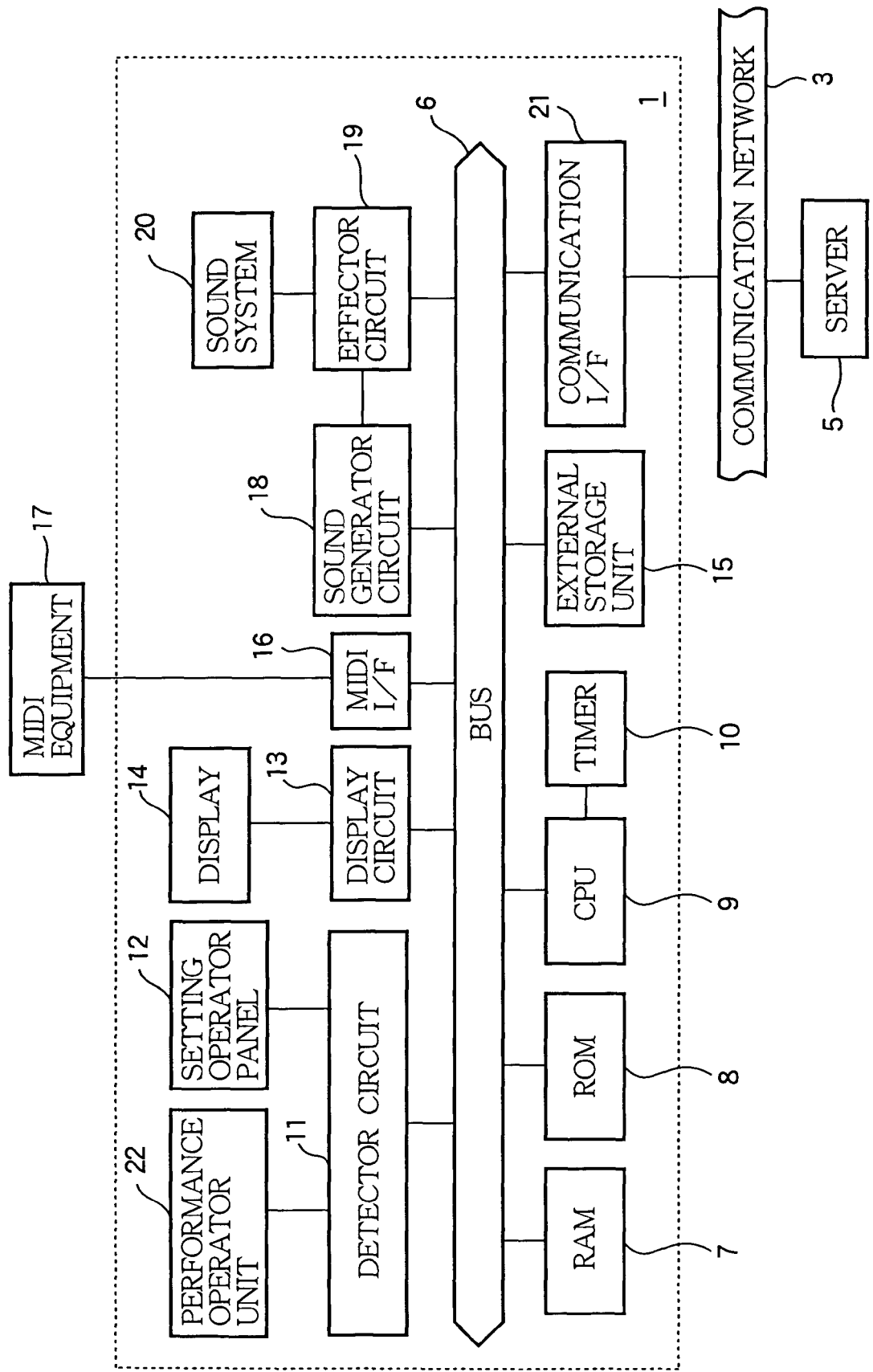
FIG. 1 is a block diagram showing the hardware structure of a music content using apparatus according to an embodiment of the present invention.

Hereafter, embodiments of the invention will be described in detail in conjunction with the accompanying drawings.

FIG. 1 is a block diagram showing the hardware structure of a music content using apparatus according to a preferred embodiment of the present invention.

The music content using apparatus 1 includes a bus 6, a RAM 7, a ROM 8, a CPU 9, a timer 10, a detector circuit 11, a operator panel 12, a performance operator unit 22, a display circuit 13, a display 14, an external storage unit 15, a MIDI interface 16, a sound generator circuit 18, an effector circuit 19, a sound system 20, and a communication interface (I/F) 21.

The RAM 7, the ROM 8, the CPU 9, the external storage unit 15, the detector circuit 11, the display circuit 13, the MIDI interface 16, the sound generator circuit 18, the effector circuit 19, and the communication interface (I/F) 21 are connected to the bus 6.

The RAM 7 has a working area of the CPU 9 as buffer, flag, register areas and for storing various parameters, etc.

The ROM 8 can store various parameters and control programs or programs for implementing the embodiment. In this case, if such programs are stored in the ROM 8, they will not need to be stored in the external storage unit 15. The ROM 8 also stores a machine unique key (machine identification information) used as a first encryption key EK1 (FIG. 2) assigned for each music content using apparatus.

The CPU 9 performs computation and control in accordance with the control programs stored in the ROM 8 or the external storage unit 15. The timer 10 connected to the CPU 9 supplies a basic clock signal, a clock for interrupt processing, etc. to the CPU 9.

A user can enter and set various data using the operator panel 12 connected to the detector circuit 11. The operator panel 12 may be of any kind, as long as it can output a signal in response to user input, including input devices or controls, such as switches, pads, faders, sliders, a text input keyboard, a mouse, a rotary encoder, a joystick, and/or joy shuttle switches. The operator panel 12 may also be software switches displayed on the screen of the display 14 and operated using another input device or control such as a mouse.

The performance operator unit 22 connected to the detector circuit 11 supplies performance information according to the performance of the user. The performance operator unit 22 can be a keyboard instrument or pad. The performance operator unit 22 may also be of any other kind as long as the user can enter performance information.

The display circuit 13 is connected to the display 14 so that it can display various kinds of information on the screen of the display 14. The display 14 can display not only various parameters of music content but also a music score and the like included in the music content. The user sees the information on the display 14 to enter and set various data, while he or she sees the music score and the like to operate the music content using apparatus for musical performance. The display 14 may also be an external display unit connected to the music content using apparatus.

The external storage unit 15 includes an external memory interface through which the external storage unit 15 is connected to the bus 6. The external storage unit 15 can store a music content CD described later and shown in FIG. 2. In this case, a media unique key (recording medium identification information) used as the first encryption key EK1 (FIG. 2) uniquely assigned for each external storage unit is recorded in the external storage unit 15. The media unique key recorded is unrewritable. Either the machine unique key or the media unique key has only to be stored in the ROM 8 or the external storage unit 15.

The external storage unit 15 is of any kind, for example, a flexible or floppy (trademark) disk drive (FDD), a hard disk drive (HDD), a magneto-optical (MO) disk drive, a CD-ROM (Compact Disk Read Only Memory) drive, a DVD (Digital Versatile Disc) drive, or a semiconductor memory.

If a hard disk drive (HDD) is connected as the external storage unit 15, the control programs or programs for implementing the embodiment can be stored on a hard disk (HDD) in the external storage unit 15. In this case, the control programs or the like are read from the hard disk into the RAM 7 so that the CPU 9 can operate in the same way as the case where the control programs or the like are stored in the ROM 8. This configuration makes it easy to add a control program or upgrade the control program.

Further, in addition to the hard disk drive, if a CD-ROM drive is connected, the control programs or programs for implementing the embodiment can also be stored on a CD-ROM. In this case, the control programs or programs for implementing the embodiment can be copied from the CD-ROM onto the hard disk. This makes it easy to install a new control program or the like or update the control program.

The MIDI interface (MIDI I/F) 15 can be connected to MIDI equipment 17, any other music instrument, sound equipment, a computer, etc. to send and receive at least MIDI signals. The MIDI interface 16 is not limited to a dedicated MIDI interface. It may be constructed using a general-purpose interface such as RS-232C, USB (Universal Serial Bus), or IEEE1394 (pronounced "eye-triple-E thirteen-ninety-four"). In this case, data other than MIDI messages may also be sent and received simultaneously.

The MIDI equipment 17 is sound equipment or music instrument connected to the MIDI interface 16. The MIDI equipment 17 is not limited to a keyboard instrument. It may be of any other type, such as a stringed instrument type, wind instrument type, or percussion instrument type. Further, the MIDI equipment is not limited to a single electronic musical instrument with a sound generator and an automatic performance device incorporated in it. They may be separate devices connected to each other using a communication method such as a MIDI network protocol or any one of various other network protocols.

The sound generator circuit 18 generates a tone signal according to a performance signal or MIDI signal, received from a music content recorded in the external storage unit 15, ROM 8 or RAM 7, or supplied from the MIDI equipment 17 or the like connected to the performance operator unit 22 or the MIDI interface 16. Then the sound generator circuit 18 supplies the tone signal to the sound system 20 through the effector circuit 19.

The effector circuit 19 imparts various kinds of sound effects to the tone signal.

The sound system 20 includes a D/A converter and a speaker to convert the tone signal supplied in a digital format to an analog signal and generate the sound of the tone signal.

The sound generator circuit 18 may be of any type, such as a waveform memory type, an FM type, a physical model type, a harmonics synthesizer type, a formant synthesizer type, an analog synthesizer type of VCO (Voltage Controlled Oscillator)+VCF (Voltage Controlled Filter)+VCA (Voltage Controlled Amplifier), or an analog simulation type.

Further, the sound generator circuit 18 is not limited to a dedicated hardware circuit. It may be configured by a DSP (Digital Signal Processor) and microprograms, by a CPU and software programs, or as a sound card.

A single sound generator circuit may also be used time-divisionally to form a plurality of sound channels, or a plurality of sound generator circuits may be used to form a plurality of sound channels by allocating one channel to each sound generator circuit.

The communication interface 21 is connectable to a communication network 3, such as a LAN (Local Area Network), the Internet, or a telephone line, through which it can be connected to a server 5.

The communication interface 21 and the communication network 3 may be of either a wired type or wireless type, or may have both types. The communication interface 21 may also be of a built-in type or removable type such as a PC card.

FIG. 2 is a conceptual diagram illustrating the format of a recording medium (external memory) 15 recording a music content according to the embodiment.

The recording medium 15 is readable by the music content using apparatus 1 (FIG. 1). For example, it is a semiconductor memory with media identification information recorded for use as the first encryption key EK1. If the music content using apparatus 1 holds the machine identification information, since the machine identification information can be used as the first encryption key EK1, the media identification information may not be recorded on the recording medium 15.

A music content CD is data including music-related information; it is composed of a header chunk HC, an encryption information chunk EC, a security information chunk SC, and content material chunks CC. The encryption information chunk EC, the security information chunk SC, and the content material chunks CC are composed of the chunk name and chunk length written in plaintext or non-encrypted form, and encrypted data, respectively.

The header chunk HC includes as header information various kinds of initial setting information written in plaintext.

The encrypted information in the encryption information chunk EC is information encrypted with the first encryption key EK1, describing information related to the ciphers, or codes, of the other chunks. For example, a second encryption key EK2 for decrypting the encrypted information in the security information chunk SC, a third encryption key EK3 for decrypting the encrypted information in a content material A chunk CC, and another third encryption key EK3 for decrypting the encrypted information in a content material B chunk CC are recorded as the encrypted information in the encryption information chunk EC.

The encrypted information in the security information chunk SC describes security rules SR governing access to each content material chunk CC. For example, when use conditions of the content material A are defined as "replay permitted (music replay, musical score display), no save permitted, and printing permitted" in security rules ASR for the content material A chunk CC, use of the content material A chunk CC is limited to replaying musical tones or displaying the musical score, disabling the music content from being saved or copied to another recording medium. Typically, the security information contained in the security information chunk specifies at least one of modes of using the content material, the modes including a replay mode that permits audible replaying of the music content from the recording medium, and a copy mode that permits copying of the music content from the recording medium to another recording medium.

The encrypted information in the security information chunk SC also includes content material identification information CID as identification information on each content material chunk CC. The identification information uniquely identifies the content material to discriminate the content material from any of existing content materials on the market.

The encrypted information in each content material chunk CC includes substantial data of the music content CD. The term "substantial data" means reproducible data, such as MIDI performance data, logic score data, and audio data. The encrypted information in each content material chunk CC also includes content material identification information CID matching the content material identification information CID included in the encrypted information in the security information chunk SC. The content material identification information CID may be embedded into the encrypted information of each content material chunk CC as independent data indicative of an event in MIDI data or the like, or as an electronic watermark.

Since the content material identification information CID in the encrypted information of the security information chunk SC and the content material identification information CID in the encrypted information of each content material chunk CC are recorded at unspecified addresses respectively, the addresses need to be searched for to read out the content material identification information CID.

The encrypted information in one content material chunk CC may be encrypted with the third encryption key EK3 different from that for the encrypted information in the other content material chunk CC, or they may be encrypted with the same encryption key. Further, the chunks are not limited to being encrypted using the same cryptographic system but different encryption keys. They may be encrypted using different cryptographic systems.

In FIG. 2, two or more content material chunks CC are included in the music content CD, but there is no limit on the number of content material chunks, as long as at least one content material chunk CC is included.

In the embodiment, the music content using apparatus 1 first decrypts the encrypted information in the encryption information chunk EC with the first encryption key EK1 to acquire the second and third encryption keys EK2 and EK3. Next, the music content using apparatus 1 decrypts the encrypted information in the security information chunk SC with the second encryption key to acquire the security rules SR for the content material chunk concerned and detect the content material identification information CID from the decrypted information. Further, the music content using apparatus 1 decrypts the encrypted information in each content material chunk CC with the third encryption key EK3 to detect the content material identification information CID from the decrypted information. After that, the content material identification information CID in the encrypted information of the security information chunk SC is compared with that of each content material chunk CC. If they match, use of the music content CD (that is, use of real data in each content material chunk CC) will be permitted according to the security rules SR.

In the embodiment, since the content material identification information CID in each content material chunk CC is compared with that in the security information chunk SC, there is a case, for example, where only the use of the content material A chunk CC is permitted, disabling the use of the other content material chunks. Therefore, if part of the content material chunks CC is replaced by that for another music data, use of the data in the replaced content material chunk is not permitted unless the content material identification information CID in the replaced content material chunk coincides with the other identification information in the security information chunk SC.

FIG. 3 is a flowchart illustrating processing for using a music content according to the embodiment of the present invention. In the processing described below, decrypted information is temporarily stored in a buffer area of the RAM 7 (FIG. 1) or the like.

The processing for using the music content starts at step SA1. Then, in step SA2, the music content CD is read out using the media identification information on the recording medium 15 or the machine identification information on the music content processor 1 as the first encryption key EK1 to decrypt the encrypted information of the encryption chunk EC in the music content CD read out using the first encryption key EK1.

In step SA3, the encrypted information of the security information chunk SC in the music content CD is decrypted with the second encryption key in the encrypted information of the encryption information chunk EC decrypted in step SA2.

In step SA4, the encrypted information of the content material chunk CC in the music content CD is decrypted with the third encryption key in the encrypted information of the encryption information chunk EC decrypted in step SA2. If the music content CD includes two or more content material chunks CC, the operation of step SA4 will be repeated for all the content material chunks.

In step SA5, the encrypted information of the security information chunk SC decrypted in step SA3 is searched for the content material identification information (content material ID) CID.

In step SA6, the encrypted information of the content material chunk CC decrypted in step SA4 is searched for the content material identification information (content material ID) CID.

In step SA7, the content material identification information CID in the encrypted information of the security information chunk SC detected in step SA5 is compared with that in the encrypted information of the content material chunk CC detected in step SA6. If there are two or more content material chunks CC, the content material identification information CID in the security information chunk SC will be compared with those for the content material chunks, respectively.

In step SA8, it is determined from the comparison result in step SA7 whether the content material identification information CID in the encrypted information of the security information chunk SC detected in step SA5 matches that in the encrypted information of the content material chunk CC detected in step SA6. If they match, the procedure goes to step SA9 indicated by a YES arrow, while if they do not match, it goes to step SA10 indicated by a NO arrow.

If no content material identification information CID is detected in step SA6 from the encrypted information of the content material chunk CC, that is, if the content material chunk CC includes no content material identification information CID, it will be considered mismatched.

If there is no content material identification information CID in the encrypted information of the security information chunk SC corresponding to that in the encrypted information of the content material chunk CC detected in step SA6, it will also be considered mismatched.

In step SA10, the use of the content material chunk CC determined to be mismatched is disabled. A determination on whether the content material chunk CC is usable or not is made for each content material chunk CC. Therefore, the content material chunk CC the use of which is disabled is only the content material chunk CC for which a determination is made that the content material identification information CID in the encrypted information of the security information chunk SC detected in step SA5 does not coincide with the content material identification information CID in the encrypted information of the content material chunk CC detected in step SA6. Further, if there is at least one mismatched content material chunk, the use of all the content material chunks CC may be disabled, because it is considered that music content CD has been tampered with.

In step SA11, the decrypted encryption information is re-encrypted or deleted, and in step SA12, the processing for using the music content is ended.

As described above, according to the disclosed embodiments, the music content includes the security information chunk and the content material chunk, and the security information chunk and the content material chunk include content material identification information, respectively. The content material identification information is read out from both chunks, and if they match, the use of the music content is permitted. Therefore, even if the music content is tampered by combining a security information chunk obtained in an authorized manner with an unauthorized content material chunk, the music content cannot be used because both pieces of content material identification information do not match with each other, thus enabling copyright protection.

The security information chunk also includes security information for defining the usage pattern or mode of the content material so that the use of the content material will be permitted on the basis of the usage pattern. Therefore, when both pieces of content material identification information match with each other, the use of the music content based on the usage pattern is enabled.

In addition, the security information chunk and the content material chunk are encrypted, and this make it difficult to decrypt the contents of each chunk and tamper with the content material identification information so as to make both pieces of content material identification information match with each other.

The embodiment may be implemented using a general-purpose computer or the like on which computer programs and the like corresponding to the embodiment are installed.

In such a case, the computer programs and the like corresponding to the embodiment may be provided to users in the form of a file(s) stored on a computer-readable recording medium, such as a CD-ROM or floppy disk.

While the invention has been described in connection with a preferred embodiments, it will be understood that it is not intended to limit the invention to this particular embodiments. It will be clear to those skilled in the art that various changes, modifications, and combinations can be made to the invention.

What is claimed is:

1. An apparatus for reproducing a music content composed of at least one content material in accordance with security information of the music content, the apparatus comprising:
- a processor;
- a reading section that accesses a recording medium which records a data file of the music content having a chunk structure including an encrypted content material chunk, an encrypted security information chunk, and an encryption information chunk, the content material chunk comprising substantial data of the content material and first identification information for uniquely identifying the content material, the security information chunk comprising security information of the content material and second identification information for uniquely identifying the content material, the encryption information chunk comprising a first encryption key for decrypting the content material chunk and a second encryption key for decrypting the security information chunk, the reading section that reads the first identification information from the content material chunk and the second identification information from the security information chunk;
- a comparison section that compares the first identification information read from the content material chunk with the second identification information read from the security information chunk; and
- a reproducing section that permits reproduction of the content material when the comparison section determines that the first identification information read from the content material chunk matches the second identification information read from the security information chunk, and that does not permit the reproduction of the content material when the comparison section determines that the first identification information does not match the second identification information,
- wherein the reading section decrypts the content material chunk using the first encryption key and decrypts the security information chunk using the second encryption key to read the respective first and second identification information from the recording medium.

2. The apparatus according to claim 1, wherein the security information contained in the security information chunk specifies a mode of using the content material, so that the reproducing section permits the reproduction of the content material under the mode specified by the security information.

3. The apparatus according to claim 1, wherein the security information contained in the security information chunk specifies at least one mode of a plurality of modes of using the content material, the plurality of modes including a replay mode that permits audible replaying of the music content from the recording medium, and a copy mode that permits copying of the music content from the recording medium to another recording medium.

4. A computer-readable medium storing a computer program installable in an apparatus having a processor for reproducing a music content composed of at least one content material in accordance with security information of the music content, the computer program being executable by the processor for causing the apparatus to perform a method comprising the steps of:
- accessing a recording medium which records a data file of the music content having a chunk structure including an encrypted content material chunk, an encrypted security information chunk, and an encryption information chunk, the content material chunk comprising substantial data of the content material and first identification information for uniquely identifying the content material, the security information chunk comprising security information of the content material and second identification information for uniquely identifying the content material, the encryption information chunk comprising a first encryption key for decrypting the content material chunk and a second encryption key for decrypting the security information chunk;
- decrypting the content material chunk using the first encryption key to read the first identification information from the content material chunk;
- decrypting the security information chunk using the second encryption key to read the second identification information from the security information chunk;
- comparing the first identification information read from the content material chunk with the second identification information read from the security information chunk;
- permitting reproduction of the content material when the first identification information read from the content material chunk matches the second identification information read from the security information chunk; and
- prohibiting the reproduction of the content material when the comparison section determines that the first identification information does not match the second identification information.

5. A recording medium storing a music content for reproduction in a music apparatus, the music content being composed of at least one content material and security information specifying a mode of using the music content, the recording medium recording a data file of the music content having a chunk structure comprising:
- an encrypted content material chunk comprising substantial data of the content material and first identification information for uniquely identifying the content material;
- an encrypted security information chunk comprising security information of the content material and second identification information for uniquely identifying the content material; and
- an encryption information chunk comprising a first encryption key for decrypting the content material chunk and a second encryption key for decrypting the security information chunk,
- whereby the content material chunk is decrypted using the first encryption key and the security information chunk is decrypted using the second encryption key, the first identification information read from the decrypted content material chunk is compared with the second identification information read from the decrypted security information chunk, reproduction of the content material under the mode specified by the security information is permitted when the first identification information read from the content material chunk matches the second identification information read from the security information chunk, and the reproduction of the content material is prohibited when the first identification information read from the content material chunk does not match the second identification information read from the security information chunk.

* * * * *